F. E. BOYD.
FRUIT AND VEGETABLE DRIER.
APPLICATION FILED AUG. 2, 1918.
1,308,036. Patented July 1, 1919.
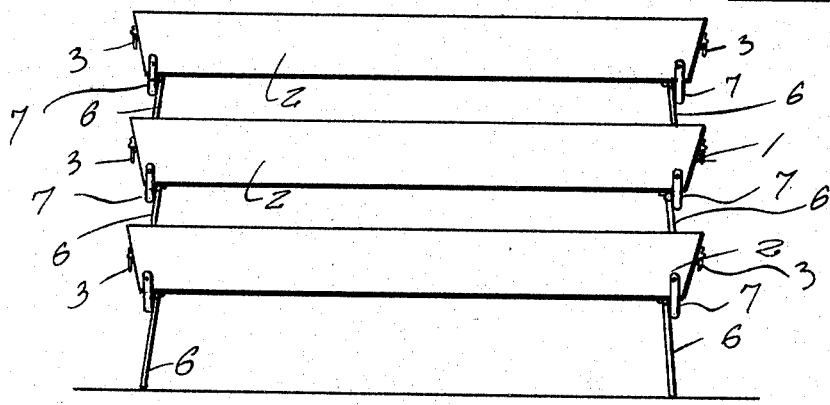
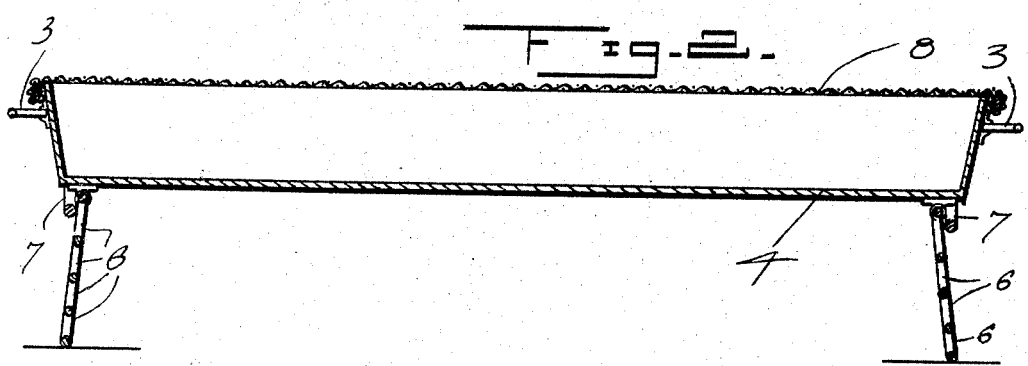
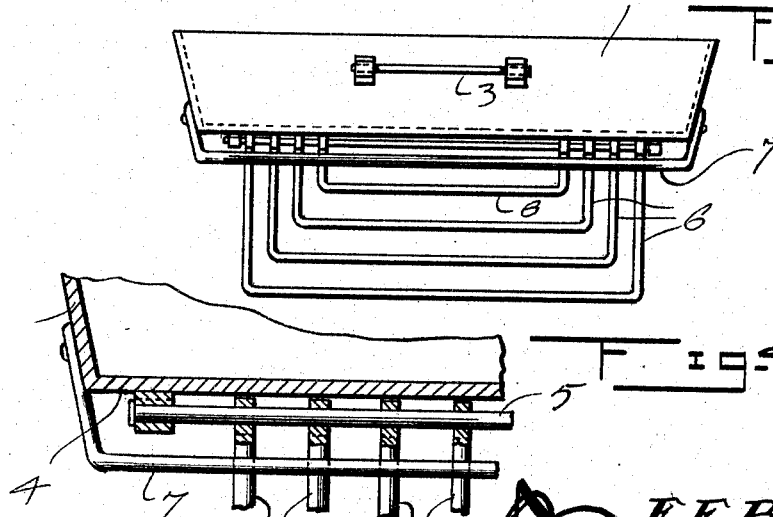
Inventor
F. E. Boyd,
By
Attorney

UNITED STATES PATENT OFFICE.

FLORENCE E. BOYD, OF LENOIR, NORTH CAROLINA.

FRUIT AND VEGETABLE DRIER.

1,308,036.  Specification of Letters Patent.  Patented July 1, 1919.

Application filed August 2, 1918. Serial No. 248,059.

*To all whom it may concern:*

Be it known that I, FLORENCE E. BOYD, a citizen of the United States, residing at Lenoir, in the county of Caldwell and State of North Carolina, have invented certain new and useful Improvements in Fruit and Vegetable Driers; and I do hereby declare the following to be a full, clear, and exact description of the invention, such as will enable others skilled in the art to which it appertains to make and use the same.

This invention relates to improvements in fruit and vegetable driers and has for one of its objects the provision of means whereby the fruit and vegetables can be subjected to various degrees of heat from a stove when placed thereover and also whereby the heat passing beyond the fruit or vegetables which are receiving their initial drying will be utilized to treat the fruit and vegetables that have been partially cured.

Another object of this invention is the provision of means whereby the device may be used in the sun instead of over a stove or artificial heat.

A further object of this invention is the provision of a fruit and vegetable drier of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation of a fruit and vegetable drier constructed in accordance with my invention, Fig. 2 is a vertical sectional view of one of the receptacles being employed in the sun for curing the vegetables or fruit, Fig. 3 is an end elevation illustrating the manner of supporting the legs in an extended position, and Fig. 4 is a detail sectional view illustrating the manner of journaling or securing the legs to the receptacle.

Referring in detail to the drawings, the numeral 1 indicates as an entirety a drier for fruit and vegetables consisting of a plurality of trays or receptacles 2 which may vary in sizes for use on stoves and other heating sources of different sizes and which have their side walls flared so that one receptacle can be placed within the other when the device is not in use. The receptacles 2 are provided with handles 3 at the ends thereof so that they can be readily lifted and carried from one point to another. Each of the receptacles are identical in construction with each other and reference to one of the receptacles as to the exact construction is thought sufficient for all.

The receptacle 2 has secured to its bottom wall 4, at each end thereof, a rod 5. A plurality of legs 6 of substantially U-shaped formation have their ends journaled to the rods 5, which journals are of the frictional type so that the legs will maintain either an extended or folded position. The legs when in a folded position underlie the bottom wall 4 of the receptacle 2, so that the various receptacles can be placed one within the other. The legs vary in sizes as clearly illustrated in Fig. 3 for the purpose of supporting the various receptacles at different distances apart and also at different distances from the stove or other heating source over which the device is placed.

The bars 7 extend transversely of the receptacle 2 adjacent each end and under the bottom wall 4 thereof and have their ends angularly related and flattened, and secured to the side walls of the receptacle. The bars 7 are located in close proximity to the rods 5 and are adapted to be engaged by the legs when in extended position to support the receptacle, to prevent said legs from collapsing.

In operation when it is desired to dry fruit and vegetables over a stove or other artificial heat, the receptacles are placed one above the other as illustrated in Fig. 1 and the heat from the stove or other artificial source passes upwardly in engagement with the various receptacles drying the fruit.

The following method of curing fruits or vegetables has proven most successful. Uncured fruits or vegetables are placed in the lowermost receptacle as they become substantially cured. The uppermost receptacle is filled with uncured fruits or vegetables and placed at the bottom of the tier of receptacles thereby raising the receptacle with the substantially cured fruits or vegetables farther from the source of heat and this practice is continued until the first named receptacle occupies the uppermost position, when it is emptied of its cured fruits or vegetables and then refilled and placed at the bottom of the tier. Therefore, it will be noted that the location of the receptacles can be changed as desired or in accordance with the condition of the fruits or vegetables without removing or disturbing said fruits or vegetables until they are entirely cured and also that the uncured fruits or vegetables will always be disposed closest to the source of heat.

When employing the device in the sun for curing vegetables or fruits, only one receptacle is employed and this is supported by the legs, and a cover 8 constructed of foraminous material is placed over the receptacle to prevent insects from coming in contact with the fruit and vegetables while being dried. This cover 8 is constructed of foraminous material having its edges secured to bars or members in any desired manner, and which bars are adapted to extend downwardly over the sides and ends of the receptacle to act as a weight for retaining the cover upon the receptacle.

While I have shown and described the preferred embodiment of my invention, it will be understood that minor changes in construction, combination, and arrangement of parts may be made, without departing from the spirit and scope of the invention as claimed.

Having thus described my invention, what I claim is:—

1. A fruit and vegetable drier comprising a plurality of flared receptacles adapted to be positioned one above the other and also to be positioned one within the other, and a plurality of legs carried by said receptacles for supporting them at various distances apart and over a heating source.

2. A fruit and vegetable drier comprising a receptacle, handles for said receptacle, rods secured to the bottom wall of said receptacle adjacent each end thereof, and a plurality of legs of various sizes frictionally connected to said rods for supporting the receptacle at various heights and which legs are capable of being folded under the receptacle.

3. A fruit and vegetable drier comprising a receptacle, a plurality of legs of various sizes pivoted to said receptacle, and bars extending across the receptacle adjacent each end and secured to the sides thereof for preventing the legs from collapsing when supporting the receptacle.

In testimony whereof I affix my signature in presence of two witnesses.

FLORENCE E. BOYD.

Witnesses:
 JNO. J. FLUCK,
 WM. MASON.

Copies of this patent may be obtained for five cents each, by addressing the "Commissioner of Patents. Washington, D. C."